United States Patent [19]

Thigpen

[11] Patent Number: 4,557,742

[45] Date of Patent: Dec. 10, 1985

[54] POLARIZED OPTICAL FIBER AND METHOD OF FORMING SAME

[75] Inventor: Lawrence E. Thigpen, Merrimac, Mass.

[73] Assignee: Polaroid Corporation, Cambridge, Mass.

[21] Appl. No.: 627,040

[22] Filed: Jul. 2, 1984

[51] Int. Cl.$^4$ .................. C03B 37/025; C03B 37/10
[52] U.S. Cl. .......................... 65/2; 65/3.11; 65/13; 350/96.3
[58] Field of Search .............. 65/2, 3.1, 3.2, 3.12, 65/13; 350/96.1, 96.3

[56] References Cited

U.S. PATENT DOCUMENTS

| | | | |
|---|---|---|---|
| 2,048,651 | 7/1936 | Norton | 83/91 |
| 3,282,668 | 11/1966 | Mabru | 65/12 |
| 3,300,288 | 1/1967 | Matthews | 65/2 |
| 3,362,803 | 1/1968 | Dannohl et al. | 65/13 |
| 3,461,943 | 8/1969 | Schile | 164/89 |
| 3,542,536 | 11/1970 | Flam et al. | 65/111 |
| 3,880,630 | 4/1975 | Izawa | 65/30 |
| 4,028,080 | 6/1977 | Vita et al. | 65/2 |
| 4,090,055 | 5/1978 | King | 219/10.55 |
| 4,262,035 | 4/1981 | Jaeger et al. | 427/39 |
| 4,276,072 | 6/1981 | O'Brien | 65/3.12 |
| 4,349,373 | 9/1982 | Sterling et al. | 65/60.8 |
| 4,455,267 | 6/1984 | Strahan et al. | 65/2 X |

*Primary Examiner*—Robert Lindsay
*Attorney, Agent, or Firm*—David R. Thornton

[57] ABSTRACT

A polarized optical fiber, having inherent birefringence provided by electrically induced orientation of its microcrystalline structure provides fixed polarization. In the method, an optical fiber having inherent birefringent characteristics is formed by heating a glass optical fiber preform to its drawing temperature, drawing the preform to reduce its diameter and cooling the resulting fiber in the presence of an applied electric field to fixedly orient the microcrystalline structure of the fiber to provide birefringent light transmitting characteristics.

12 Claims, 4 Drawing Figures

POLARIZED OPTICAL FIBER AND METHOD OF FORMING SAME

BACKGROUND OF THE INVENTION

This invention relates to optical fibers and a method of fabricating the same. More particularly, it concerns optical fibers having optical characteristics capable of providing polarization retaining or polarization locking properties and a method of fabricating the same.

In optical fibers, such as single-mode optical fibers, it is desirable that the optical fiber or optical waveguide have polarization locking or retaining properties by which the polarized state of the propagated light energy is retained throughout the complete length of the fiber. The polarization locking properties are utilized in single-mode optical waveguide communications as well as in physical condition sensors in which changes in a sensed condition cause measurable perturbations in the polarization of propagated light.

Prior single-mode optical waveguide fibers have utilized non-circular cores in an effort to achieve the desired polarization locking or retaining characteristics. In addition to the use of non-circular cores, optical fiber structures have been fabricated to place the core under loading forces on preestablished lateral or diametric axes to cause stress birefringence by fabricating the core and cladding components from glasses having different thermal coefficients of expansion (TCE). When light is propagated along fibers of this type, the propagated light energy polarizes on an axis generally parallel to the axis of the force-induced stress and on an axis perpendicular to the first axis due to slightly different stress-induced indices of refraction on the two orthogonal diametric axes.

While the prior techniques for achieving polarization locking or retaining properties in fiber optical waveguides have shown promise, the need for waveguide structures by which birefringence is physically induced represents a compromise as compared with a waveguide having inherent birefringence to display two different indices of refraction on mutually orthogonal diametric axes. Hence, there is a need for single-mode optical waveguides in which the material of the waveguide exhibits an inherent or pre-established birefringence.

SUMMARY OF THE INVENTION

In accordance with the present invention, an optical fiber having an oriented microcrystalline structure causing inherent, fixed birefringence is provided without resorting to a non-symmetrical core or stress-induced birefringence, although the oriented structure may, of course, be usefully combined with such other means of inducing birefringence. In the method for forming polarization-locking optical waveguide fibers, the microcrystalline structure of the waveguide core is modified to exhibit different indices of refraction on two mutually orthogonal lateral axes by subjecting the heated glass fiber to a preferentially oriented electric field as the fiber is cooled.

In the practice of the preferred method, an optical fiber preform, having a central core region and a surrounding cladding region, is fed to a heating zone in which the temperature of the preform is elevated to drawing temperatures in conventional fashion. As the preform is drawn down to waveguide dimensions in one or more drawing stages and while the material thereof is in and being cooled from its plastic temperature, it is subjected to a preferentially oriented electric field to align its microcrystalline structure; the alignment of the microcrystalline structure being retained until the fiber being drawn is cooled to a temperature at which the mobility of its molecular structure is at a minimum or to the temperature at which it solidifies. As a result of the microcrystalline alignment, the resulting fiber exhibits an inherent birefringence by which the indices of refraction on two mutually orthogonal lateral axes differ.

A principal objective of the present invention is, therefore, the provision of an improved method for forming optical fibers, particularly optical fibers of a single-mode waveguide type, having birefringent characteristics that provide polarization locking or retaining transmission charactersitics.

Other objects and further scope of applicability of the present invention will become apparent from the detailed description to follow taken in conjunction with the accompanying drawings in which like parts are designated by like reference characters.

DESCRIPTION OF THE PREFERRED EMBODIMENT

The process of the present invention can be utilized to manufacture optical fibers or optical waveguides having inherently birefringent, light transmitting regions with polarization locking or retaining characteristics. Optical waveguides manufactured in accordance with the preferred embodiment include a central core having indices of refraction that differ along mutually orthogonal axes and a cladding layer that surrounds the core and has an index of refraction less than that of the core. For optical waveguides of the single-mode type, the core can have a diameter in the range of 1 to 5 microns and the cladding layer can have a wall thickness of 2 to 3 times that of the core diameter.

The optical waveguide cores and the surrounding cladding layer are typically manufactured from fused silica ($S_iO_2$) with the index of refraction of the core relatively higher than that of the cladding. The index of refraction of silica may be adjusted during the manufacturing process, as described below, by adding one or more dopants to the core or cladding layer to increase or decrease the index of refraction. For example, where pure fused silica is used as the cladding material, the core material can be doped with a dopant to increase its relative index of refraction. Where pure fused silica is used as the core material, the cladding material can be doped with dopant to reduce its index of refraction. Also, the silica used for the core and cladding can be each doped to increase or decrease the respective index of refraction to provide the desired relative difference between the indices of refraction of the cladding and the core.

Figure 1:
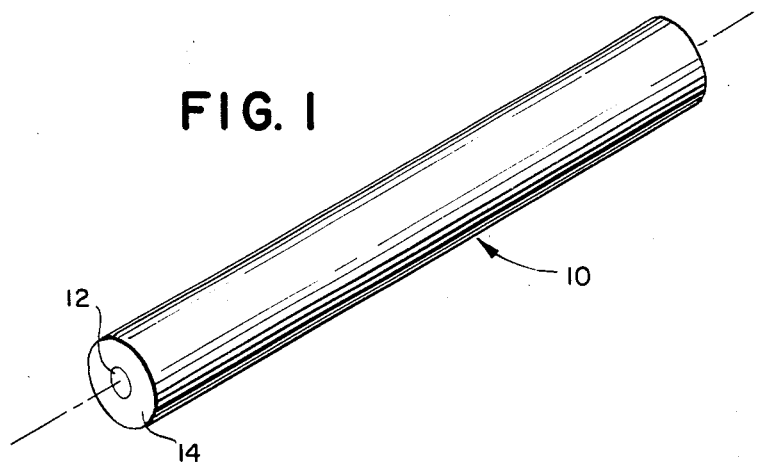
FIG. 1 is a perspective view of a glass preform provided for manufacturing optical fibers in accordance with the present invention.

The manufacture of optical waveguides in accordance with the preferred embodiment of the present invention begins with the provision of an optical preform of the type illustrated in FIG. 1 designated generally therein by the reference character 10. The preform 10 includes a central core region 12 and a layer of cladding material 14 formed on the exterior of the core material. Optical preforms 10 of the type shown in FIG. 1 suitable for praticing the present invention are available commercially. Also, suitable optical preforms 10 can be prepared by first fabricating a cylindrical core rod that will form the central core region of the preform 10. The core rod can be fabricated from pure fused silica, or a germanosilicate or phosphosilicate glass, which latter glasses have an index of refraction higher than that of pure fused silica. The external surface of the core rod should be free from surface irregularities and particulate or other contamination. The exterior surface of the core rod can be prepared by polishing and cleaning to remove surface irregularities and contamination which may later cause light scatter centers in the resulting fiber. Surface polishing may be achieved by mechanical polishing, fire polishing, laser milling, or the like.

After the core rod is prepared, a coating, film or layer 14 of cladding material is applied or otherwise deposited onto the external surface of the core rod. The cladding layer 14 can be applied using several known methods including chemical vapor deposition (CVD), flame hydrolysis, plasma deposition, vapor-phase axial deposition (VAD), deposition of a glass frit, and the like. Where chemical vapor deposition (CVD) technique is used, the vapor of silicon tetrachloride is mixed with oxygen and passed along the exterior of the core rod. When heated to a temperature in the region of 1800° C., oxidation occurs to deposit a fine soot of particulate silica which sinters to form the cladding layer 14 on the exterior surface of the core rod.

During the application of the cladding layer 14, the core rod can be rotated relative to the layer applying device or structure so that a layer of uniform thickness and composition is applied. As can be appreciated by those skilled in the art, the cladding layer 14 can be built up of several thinner layers to form a multi-layer composite layer. Where the core material is pure fused silica, the cladding layer 14 can be formed from pure fused silica doped with one or more known materials that lower the index of refraction relative to that of the core. Suitable dopants include boron and fluorine. It should be understood, however, that the invention is generally applicable to most any type of optical fiber wherein fixed birefringence is desired.

Figure 2:
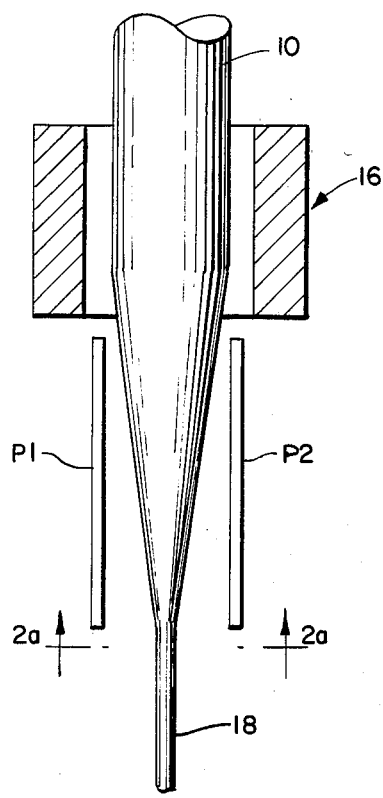
FIG. 2 is an elevational cross-sectional view of a preform heating furnace containing a heated preform and a drawn fiber passing through opposed electrodes.
Figure 3:
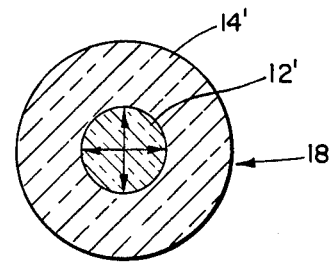
FIG. 3 is a cross-sectional view of an optical waveguide formed in accordance with the present invention.

After the formation of the preform 10 of FIG. 1, the preform is heated, for example, in a drawing furnace, generally designated in FIG. 2 by the reference character 16. The end of the preform 10 is heated to a temperature at or above its plastic or drawing temperature with the heated preform connected to a drawing or "bait" rod (not shown) by heating the end of the drawing rod until it softens and by joining its softened end to the center portion of the heated end of the preform 10. Thereafter, and as shown in FIG. 3, the preform 10 is advanced into the heating zone of the furnace 16 while the fiber 18 is withdrawn.

Figure 2A:
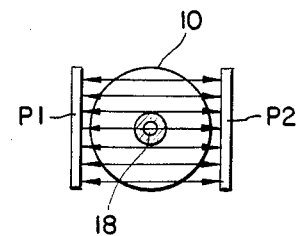
FIG. 2a is a cross-sectional end view of the drawn fiber taken along line 2a—2a of FIG. 2.

As shown in FIGS. 2 and 2a, the hot fiber 18, as it is withdrawn from the furnace 16, is passed between conductive electrode plates P1 and P2 that carry a substantial electrical potential to form an oriented or directed electrical field therebetween. The microcrystalline structure of the glass will be affected by the presence of the electric field, symbolically represented in FIG. 2A by the parallel arrows, to effect an orientation thereof such as an alignment thereof along the direction of the field.

There are several factors that will affect the final or permanent orientation of the microcrystalline structure of the glass including the temperature, or temperature range, of the glass during exposure, the field intensity, and the length of time that the glass is exposed to the applied field.

In the drawing operation, the glass is in a plastic state as it is drawn, and in the practice of the present invention the temperature of the glass as it is drawn from the furance 16 should be as high as practicable so the glass is least viscous, and thus, the most susceptible to the aligning effect of the appplied electric field. Of course, the temperature of the glass should not be so high as to compromise the ability to draw the fiber from the preform. It is recognized that the conductivity of the glass increases with increasing temperature and that the conductivity can lessen the alignment effect. However, it is believed that the adverse effect of the increased conductivity of the glass, if any, at such low viscosity temperatures is less than the beneficial effect of increased susceptability to the desired microcrystalline realignment by exposure to an applied field.

In the illustrated embodiment, the induced alignment of the microcrystalline structure is provided by electrically aligning the molecular structure of the glass waveguide as it is being drawn from the preform. Thus, the one temperature operation is employed for both drawing of the fiber and the molecular or microcrystalline alignment. While the electrical alignment may also be provided or extended by the use of separate or auxiliary heating, it should be understood that the field is applied while the fiber is cooled from a high temperature (e.g., close to the temperature at which the core material is plastic or semi-plastic), thereby permitting molecular orientation under electrical fields, to a low temperature (e.g., approaching solidification), where relaxation of the aligned or oriented microcrystalline structure is prohibited.

It is preferable to expose the heated fiber to as high a field intensity as possible. Thus, the voltage drop across the plates P1 and P2 should be as high as practical without causing dielectric breakdown or ionization. In this regard, the nature of the dielectric, e.g., air, between the plates P1 and P2 can be controlled to permit increased field intensities. In addition, the length of the plates P1 and P2 should at least equal and preferably exceed the length of the thermal zone in which the fiber is still in its plastic and semi-plastic state. Preferably, the length of the plates P1 and P2 should be larger than the aforementioned thermal zone, for example, 2 to 3 feet in length for conventional fiber drawing operations, so that the glass solidifies in the presence of the applied field. As can be appreciated by those skilled in the art, auxiliary heaters (not shown) may be provided to extend the aforementioned thermal zone and extend the length of time that the heated fiber is exposed to the applied field.

The electrical energy applied to the plates P1 and P2 can be provided from a suitable source (not shown) including a direct or alternating current source, although alternating current having a frequency greater than 500 Hertz is preferred.

The resulting fiber 18, as shown in the end view of FIG. 3, has a core 12' and cladding 14' with the microcrystalline structure of the core preferentially aligned in the field direction so that the core has an inherent birefringent characteristic well suited to the transmission of polarized light energy.

While the exact mechanism by which the applied electric field causes the altering of the core to provide an inherent birefringent material is not known, it is believed that the atoms and/or molecules that define the crystal structures reorient in the presence of the applied field while the glass is above the transformation temperature and retain that reorientation as the glass solidifies below the transformation temperature so that light energy propagating in the fiber encounters an asymmetric, anisotropic microcrystalline structure which thereby exhibits birefringence.

In a specific example, an optical fiber preform of doped fused silica is heated to approximately 1500° C. in the drawing furnace 16 and drawn between electrodes P1 and P2 to which an alternating current of 500 Hertz is applied. The plates extend from the exit of the furnace 17 for approximately 3 feet such that the drawn fiber is cooled to approximately 500° C. as it exits the electric field.

Consequently, it should be recognized that the essence of the method of the invention is the cooling of the glass fiber, during the drawing operation or otherwise, through a given temperature range from a high temperature of low viscosity permitting alteration of its microcrystalline structure to a low temperature substantially precluding such alteration while applying an oriented, high voltage electric field across the fiber.

Thus, it will be appreciated that as a result of the present invention, a highly effected and an improved process for manufacturing optical fibers having polarization locking or retaining characteristics is provided by which the principal objective, among others is completely fulfilled. It will be equally apparent and is contemplated that modification and or changes may be made in the illustrated embodiment without departure from the present invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A method for forming an optical fiber having an inherent birefringence comprising the steps of
    cooling a heated glass optical fiber through a given temperature range from a relatively high temperature of low viscosity, permitting orientation of its microcrystalline structure, to a relatively low temperature of high viscosity, substantially precluding alteration of its microcrystalline structure; and
    applying an electric field of given orientation across said optical fiber during said cooling step to initially orient the microcrystalline structure of the fiber when it is at said high temperature and maintain said orientation until said fiber is cooled to said low temperature.

2. The method of claim 1 wherein said heated fiber is advanced along a given path during said cooling and said electric field is applied along a length of said path at least commensurate with the length of path wherein said fiber cools from said high to said low temperature.

3. The method of claim 1 wherein said high temperature is at least a temperature at which said fiber is semi-plastic.

4. The method of claim 3 wherein said low temperature is below a temperature at which said fiber is semi-plastic.

5. The method of claim 3 wherein said applied field is an alternating field, exceeding 500 Hertz.

6. A method for forming an optical fiber having inherent birefringence, said method comprising the steps of:
    providing an optical fiber preform;
    heating the preform to a drawing temperature sufficiently high to permit drawing of the preform to reduce its cross-sectional diameter to produce an optical fiber; and
    drawing the so-heated preform to reduce its cross-sectional diameter and cooling the resultant product to form an optical fiber, said drawing and cooling step being performed in the presence of an applied electric field of sufficient intensity to alter the microcrystalline structure of the heated fiber material to induce birefringent optical characteristics in the resulting fiber.

7. The method of claim 6 wherein said drawing and cooling step further comprises drawing the optical fiber between conductive electrode plates that have a voltage potential applied thereto to form the electric field therebetween.

8. The method of claim 7 wherein the voltage potential applied to said electrode plates is just less than the breakdown voltage therebetween.

9. The method of claim 6 wherein said drawing and cooling step further comprises cooling the fiber to a temperature below its plastic temperature in the presence of the applied electric field.

10. The method of claim 7 wherein the voltage applied to said plates is an alternating voltage.

11. The method of claim 10 wherein the alternating voltage alternates at a frequency greater than 500 Hertz.

12. The optical wave guide made by the process of claim 1.

* * * * *